United States Patent
Oniwa et al.

(10) Patent No.: US 10,788,824 B2
(45) Date of Patent: Sep. 29, 2020

(54) AUTOMATIC DRIVING CONTROL DEVICE

(71) Applicant: HONDA MOTOR CO., LTD, Minato-ku, Tokyo (JP)

(72) Inventors: Yoshihiro Oniwa, Wako (JP); Mineyuki Yoshida, Wako (JP); Hironobu Kiryu, Wako (JP); Kunimichi Hatano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 223 days.

(21) Appl. No.: 15/572,834

(22) PCT Filed: Apr. 5, 2016

(86) PCT No.: PCT/JP2016/061060
§ 371 (c)(1),
(2) Date: Nov. 9, 2017

(87) PCT Pub. No.: WO2016/181725
PCT Pub. Date: Nov. 17, 2016

(65) Prior Publication Data
US 2018/0157256 A1   Jun. 7, 2018

(30) Foreign Application Priority Data
May 14, 2015   (JP) .................... 2015-098696

(51) Int. Cl.
*G05D 1/00*   (2006.01)
*B60W 50/08*   (2020.01)
(Continued)

(52) U.S. Cl.
CPC ........... *G05D 1/0061* (2013.01); *B60W 10/18* (2013.01); *B60W 40/09* (2013.01);
(Continued)

(58) Field of Classification Search
CPC .... B60W 10/18; B60W 50/082; B60W 50/10; B60W 40/09; B60W 50/14;
(Continued)

(56) References Cited

U.S. PATENT DOCUMENTS

| 5,774,069 A | 6/1998 | Tanaka et al. |
| 2005/0043867 A1 | 2/2005 | Kudo |

(Continued)

FOREIGN PATENT DOCUMENTS

| FR | 3005925 A1 * | 11/2014 | ............ B60W 50/12 |
| JP | 09-058503 | 3/1997 | |

(Continued)

OTHER PUBLICATIONS

International Search Report for International Patent Application No. PCT/JP2016/061060 dated Jul. 5, 2016, 5 pages.

(Continued)

*Primary Examiner* — Dale W Hilgendorf
(74) *Attorney, Agent, or Firm* — Amin, Turocy & Watson, LLP

(57) ABSTRACT

When an occurrence of override due to an acceleration/deceleration operation and/or a steering operation is detected by an acceleration/deceleration override detection unit and/or a steering override detection unit, a driving mode is switched by a mode switching unit to a semi-automatic driving mode in which the degree of automatic control is higher than when an occurrence of override due to the acceleration/deceleration operation and the steering operation is detected. According to this configuration, the degree of automatic control can be appropriately regulated in accordance with an override state, so a vehicular behavior not intended by the driver can be prevented. In addition, because the partial automatic control is maintained, the burden of driving can be reduced.

14 Claims, 5 Drawing Sheets

(51) Int. Cl.
    *B60W 10/18*    (2012.01)
    *B60W 50/14*    (2020.01)
    *B60W 40/09*    (2012.01)
    *B60W 50/10*    (2012.01)
    *B60W 50/00*    (2006.01)

(52) U.S. Cl.
    CPC .......... *B60W 50/082* (2013.01); *B60W 50/10* (2013.01); *B60W 50/14* (2013.01); *B60W 2050/0073* (2013.01); *B60W 2050/0096* (2013.01); *B60W 2540/10* (2013.01); *B60W 2540/12* (2013.01); *B60W 2540/18* (2013.01)

(58) Field of Classification Search
    CPC . B60W 2050/0073; B60W 2050/0096; B60W 2540/10; B60W 2540/12; B60W 2540/18; G05D 1/0061
    See application file for complete search history.

(56)         References Cited

U.S. PATENT DOCUMENTS

2015/0283998 A1*  10/2015  Lind et al. .......... B60W 50/082
                                                       701/23
2016/0103449 A1*   4/2016  Desnoyer et al. ... G05D 1/0061
                                                       701/23
2016/0304124 A1*  10/2016  Fujiyoshi et al. ... G05D 1/0061

FOREIGN PATENT DOCUMENTS

| JP | 09-161196   | 6/1997  |
| JP | 2000-153769 | 6/2000  |
| JP | 2000-276690 | 10/2000 |
| JP | 2003-026025 | 1/2003  |
| JP | 2005-67322  | 3/2005  |
| JP | 2005-250564 | 9/2005  |
| JP | 2008-162524 | 7/2008  |
| JP | 2011-118603 | 6/2011  |
| JP | 2011-131838 | 7/2011  |
| JP | 2012-051441 | 3/2012  |

OTHER PUBLICATIONS

Written Opinion for International Patent Application No. PCT/JP2016/061060 dated Jul. 5, 2016, 5 pages.
Japanese Office Action for Japanese Patent Application No. 2019-005631 dated Dec. 3, 2019.

* cited by examiner

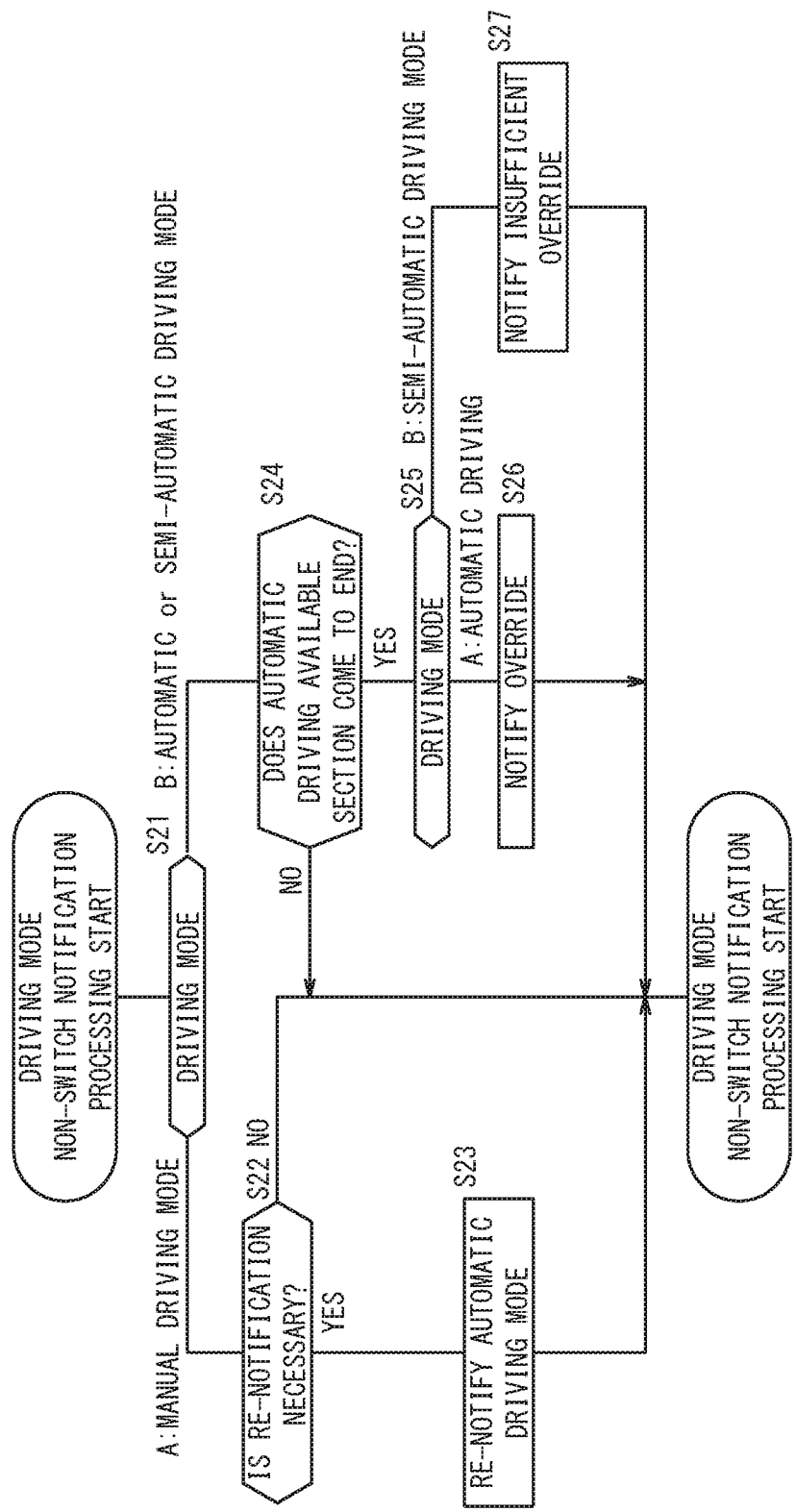

AUTOMATIC DRIVING CONTROL DEVICE

TECHNICAL FIELD

The present invention relates to an automatic driving control device that automatically controls acceleration/deceleration and steering of a vehicle.

BACKGROUND ART

Currently, automatic driving control devices are developed to automatically control acceleration/deceleration and steering by an in-vehicle system and thereby automatically drive (autonomously travel) a vehicle. According to a predetermined operation of the passenger, the vehicle in which the automatic driving control device is mounted switches from automatic driving by automatic control to manual driving by manual control of a passenger.

For example, Japanese Laid-Open Patent Publication No. 2005-067322 discloses an automatic driving control device that switches from automatic driving (automatic control of acceleration/deceleration and steering) to manual driving, according to a steering operation performed by a passenger. More specifically, in a state where the automatic driving is executed, when the steering operation of the passenger increases a steering torque compared to a predetermined threshold, this automatic driving control device estimates that the passenger intends to drive manually, and switches the automatic driving to the manual driving.

SUMMARY OF INVENTION

The device disclosed in Japanese Laid-Open Patent Publication No. 2005-067322 temporarily decelerates a vehicle when switching from the automatic driving to the manual driving, and then cancels automatic control of the steering and acceleration/deceleration. This device causes unintended deceleration G when the passenger performs a steering operation intending to switch from the automatic driving to the manual driving. Therefore, it is concerned that a vehicle behavior becomes unstable.

The device disclosed in Japanese Laid-Open Patent Publication No. 2005-067322 cancels not only the automatic steering control but also the automatic acceleration/deceleration control, in accordance with the steering operation. Therefore, it is not possible to sufficiently reduce a burden of driving.

The present invention has been made by taking into account such problems. An object of the present invention is to provide an automatic driving control device that can prevent a vehicle behavior unintended by a passenger, and reduce a burden of driving.

The present invention is an automatic driving control device including: a control unit configured to automatically control acceleration/deceleration and steering of a vehicle; an override detecting unit configured to detect overrides by an accelerating/decelerating operation and a steering operation performed by a passenger of the vehicle; and a switching unit configured to switch a driving mode including an automatic driving mode and a manual driving mode based on a detection result of the override detecting unit, and when the override detecting unit detects the override by one of the accelerating/decelerating operation and the steering operation, the switching unit is configured to switch the driving mode to a semi-automatic driving mode having a high degree of the automatic control compared to a case where the overrides by the accelerating/decelerating operation and the steering operation are detected.

In the present specification, during a state of continued automatic driving, prioritization of manual control performed by the passenger over the automatic control, or an operation of switching from automatic control performed by the control unit to the manual control performed by the passenger, will be referred to as an override. Further, completely switching from the automatic driving to the full manual driving and thereby transferring (handing over) a vehicle operation authority to the passenger will be referred to as a handover.

In the present invention, in a case of detecting the override by one of the accelerating/decelerating operation and the steering operation performed by the passenger of the vehicle, the acceleration/deceleration and the steering of the vehicle are partially and automatically controlled. That is, according to the override by only one of the accelerating/decelerating operation and the steering operation performed by the passenger of the vehicle, the automatic driving is not switched to full manual driving. According to the present invention, it is possible to appropriately control the degree of automatic control according to an override state, and consequently prevent a vehicle behavior unintended by the passenger. The partial automatic control is maintained, so that it is possible to reduce a burden of driving.

According to the automatic driving control device according to the present invention, the semi-automatic driving mode may be a driving mode configured to deactivate only the automatic control corresponding to one of the accelerating/decelerating operation and the steering operation that is detected by the override detecting unit. According to the present invention, it is possible to deactivate only the automatic control of an operation target that the passenger intends to manually control. Consequently, it is possible to prevent the vehicle behavior unintended by the passenger, and reduce the burden of driving. Further, it is possible to transfer the operation authority of the operation target that the passenger intends to manually control, smoothly from a system to the passenger.

According to the automatic driving control device according to the present invention, when the override detecting unit detects the overrides by the accelerating/decelerating operation and the steering operation, the switching unit may be configured to switch the driving mode to the manual driving mode. According to the present invention, it is possible to transfer the vehicle operation authority smoothly from the system to the passenger.

According to the automatic driving control device according to the present invention, when the driving mode is the semi-automatic driving mode, and when the override detecting unit detects the overrides by the accelerating/decelerating operation and the steering operation, the switching unit may be configured to switch the driving mode to the manual driving mode. According to the present invention, it is possible to transfer the vehicle operation authority smoothly from the system to the passenger.

According to the automatic driving control device according to the present invention, when the driving mode is the semi-automatic driving mode, and when the override detecting unit no longer detects the override by any one of the accelerating/decelerating operation and the steering operation, the switching unit may be configured to return the driving mode to the automatic driving mode. According to the present invention, it is possible to smoothly resume the automatic driving without performing an operation of starting the automatic driving.

The automatic driving control device according to the present invention may further include a situation determining unit configured to determine whether or not a situation where the override was made corresponds to a predetermined situation. After the switching unit switched the driving mode to the manual driving mode in response to the overrides by the accelerating/decelerating operation and the steering operation detected by the override detecting unit, and when the override detecting unit no longer detects the overrides by the accelerating/decelerating operation and the steering operation, and when the situation determining unit determines that a situation where the overrides were made corresponds to the predetermined situation, the switching unit may be configured to return the driving mode to the automatic driving mode.

There is a predetermined situation that requires an override during the automatic driving. For example, the predetermined situation includes a case that the vehicle changes a lane, that the vehicle travels at a branch or a junction, or that the vehicle travels at a point (e.g., tollgate or the like) at which the vehicle needs to be temporarily manually driven. According to the present invention, when the situation where the override was made corresponds to such a predetermined situation, and the override operation is no longer performed, the manual driving is automatically returned to the automatic driving. According to the present invention, only when the vehicle is in an appropriate state, it is possible to smoothly resume the automatic driving without performing the operation of starting the automatic driving.

The automatic driving control device according to the present invention may further include a notifying unit configured to notify a state of the driving mode when the switching unit switches the driving mode. According to the present invention, it is possible to make the passenger recognize the current driving mode.

The automatic driving control device according to the present invention may further include a manual operation detecting unit configured to detect the accelerating/decelerating operation and the steering operation performed by the passenger of the vehicle. The notifying unit may be configured to re-notify the state of the driving mode, after the switching unit switched the driving mode to the manual driving mode, and when the manual operation detecting unit no longer detects at least one of the accelerating/decelerating operation and the steering operation. According to the present invention, even when the passenger forgets or does not notice the switch of the driving mode to the manual driving mode, it is possible to make the passenger notice the switched mode.

The automatic driving control device according to the present invention may further include a position determining unit configured to determine whether or not a traveling position of the vehicle is in an automatic driving available section. The notifying unit may be configured to perform first notification for encouraging the overrides by the accelerating/decelerating operation and the steering operation when the position determining unit determines that an end position of the automatic driving available section is approaching, and the notifying unit may be configured to perform second notification for encouraging the override by the accelerating/decelerating operation and/or the steering operation that is not detected by the override detecting unit when the override detecting unit does not detect the overrides by the accelerating/decelerating operation and the steering operation after the first notification.

When the automatic driving available section comes to an end, it is necessary to perform a so-called handover which finishes the automatic driving and switches to the manual driving. According to the present invention, in a case the handover has not been finished even when the handover needs to be performed, the override that is necessary to satisfy a handover condition is notified and encouraged to the passenger. According to the present invention, it is possible to make the passenger recognize a necessary operation.

According to the present invention, it is possible to appropriately control the degree of automatic control according to the override state, and consequently prevent the vehicle behavior unintended by the passenger. Further, it is possible to maintain the partial automatic control, and consequently reduce the burden of driving.

BRIEF DESCRIPTION OF DRAWINGS

FIG. 5 is a flowchart for explaining driving mode non-switch notification processing.

DESCRIPTION OF EMBODIMENTS

Preferred embodiments of an automatic driving control device 12 according to the present invention will be described in detail below with reference to the accompanying drawings.

[Configuration of Automatic Driving Control Device 12]

Figure 1:
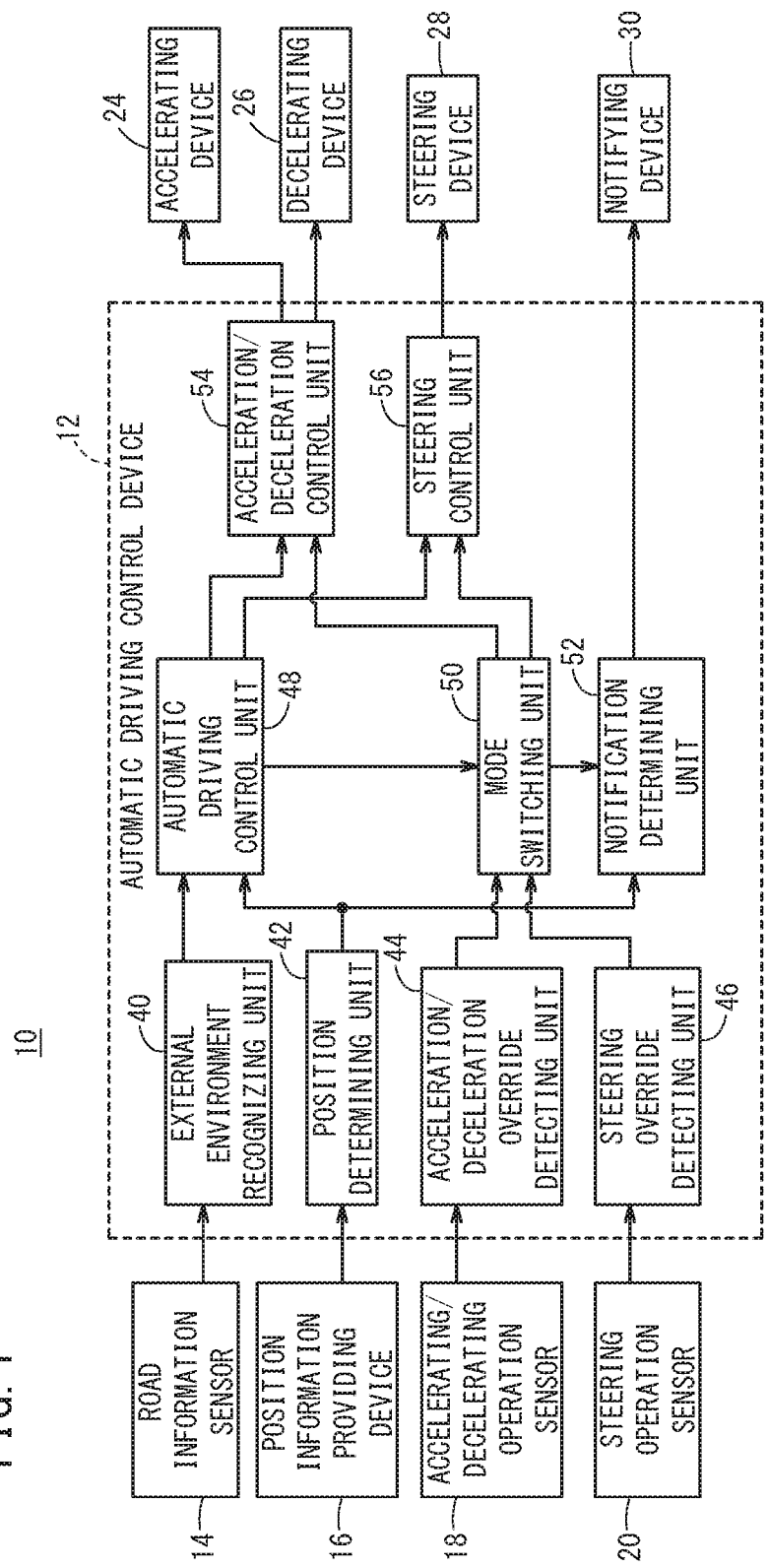
FIG. 1 is a block diagram of a vehicle including an automatic driving control device.

Configurations of the automatic driving control device 12 of a vehicle 10 and peripheral devices of the automatic driving control device 12 will be described with reference to FIG. 1. The vehicle 10 includes the automatic driving control device 12. The vehicle 10 includes on an input side of the automatic driving control device 12, a road information sensor 14 that obtains road environment information around the vehicle 10, a position information providing device 16 that provides position information and map information of the vehicle 10, an accelerating/decelerating operation sensor 18 that detects an accelerating/decelerating operation performed by a passenger, and a steering operation sensor 20 that detects a steering operation performed by the passenger. The vehicle 10 includes on an output side of the automatic driving control device 12 an accelerating device 24 that accelerates the vehicle 10, a decelerating device 26 that decelerates the vehicle 10, a steering device 28 that steers the vehicle 10, and a notifying device 30 that notifies the passenger of information.

The road information sensor 14 includes, for example, a camera that captures images of the surroundings of the vehicle 10, and a radar device that irradiates the surroundings of the vehicle 10 with electromagnetic waves and detects reflected waves. For the camera, a monocular camera or a stereo camera can be used. The camera is disposed at, for example, an upper portion inside a front windshield of the vehicle 10. For the radar device, radar devices such as a millimeter wave radar, a microwave radar, and a laser radar can be used, and an infrared sensor can also be used. The radar device is deposed in a front grill of the vehicle 10.

The position information providing device 16 detects position information of the vehicle 10, and outputs this position information and map information that includes information of an automatic driving available section, to the automatic driving control device 12. For example, a navigation device can be used, which includes a GPS antenna, a GPS receiver, an azimuth sensor, a vehicle speed sensor, a navigation computer, map data and the like.

The accelerating/decelerating operation sensor 18 detects the accelerating/decelerating operation performed by the passenger, and outputs an acceleration/deceleration signal to the automatic driving control device 12. Any sensor can be used for the accelerating/decelerating operation sensor 18 as long as the sensor can detect an accelerating/decelerating operation performed by the passenger. For example, a pressure sensor that detects a stepping force produced at a pedal (an accelerator pedal 64, a brake pedal 66, etc. shown in FIG. 2) can be used. A displacement sensor that detects a pedal operation amount can be used. When the vehicle 10 is equipped with a device that produces an operation reaction force at the pedal by using an electrical motor, a current sensor that detects a current value of the electrical motor can be used. When the vehicle 10 is equipped with a device that generates an acceleration/deceleration command according to a passenger's operation of an operator (e.g., a joy stick, a button, and a switch), this acceleration/deceleration command can be used.

The steering operation sensor 20 detects a steering operation performed by the passenger, and outputs a steering signal to the automatic driving control device 12. Any sensor can be used for the steering operation sensor 20 as long as the sensor can detect the steering operation performed by the passenger. For example, a torque sensor that detects a steering torque produced at a steering shaft can be used. A touch sensor that detects a contact with a steering wheel 60 (see FIG. 2) can be used. By detecting a difference between a steering angle of the steering wheel 60 and a target steering angle calculated to automatically control the steering, it is also possible to detect the steering operation performed by the passenger. In this regard, the steering angle of the steering wheel 60 can be detected by a sensor that detects an angular velocity or each acceleration. When the vehicle 10 is equipped with the device that causes the electrical motor of an electrical power steering to produce an operation reaction force at a steering shaft, it is also possible to detect the steering operation performed by the passenger by detecting the difference between the current value of the electrical motor and the target current value. By detecting an angular deviation (an angular velocity deviation or an angular acceleration deviation) between the steering angle of the steering wheel 60 and a rotation angle of a pinion in a steering gearbox, it is also possible to detect the steering operation performed by the passenger. Both of the angles can be detected by a sensor that detects an angular velocity or an angular acceleration. When the vehicle 10 is equipped with a device that generates a steering command according to a passenger's operation of the operator (e.g., the joy stick, the button, and the switch), this steering command can be used.

The automatic driving control device 12 is configured by an ECU. The ECU is a calculator including a microcomputer, and has a CPU (Central Processing Unit), a ROM (including an EEPROM, too) that is a memory, a RAM (random access memory), input/output devices such as an A/D converter and a D/A converter, and so on. When the CPU reads and executes a program recorded in the ROM, the ECU functions as various function implementing units such as various control units, calculating units, and processing units. The ECU that configures the automatic driving control device 12 according to the present embodiment includes an external environment recognizing unit 40, a position determining unit 42, an acceleration/deceleration override detecting unit 44, a steering override detecting unit 46, an automatic driving control unit 48, a mode switching unit 50, a notification determining unit 52, an acceleration/deceleration control unit 54, and a steering control unit 56.

The external environment recognizing unit 40 is configured to recognize a lane mark or the like based on image information obtained by a camera of the road information sensor 14, and recognize an object such as a preceding vehicle based on reflected wave information obtained by the radar device.

The position determining unit 42 is configured to obtain position information and map information of the vehicle 10 provided by the position information providing device 16, and to determine a positional relationship between the vehicle 10 and the automatic driving available section. For example, the position determining unit 42 is configured to determine whether or not the vehicle 10 is traveling in the automatic driving available section. Further, the position determining unit 42 is configured to determine whether or not the end position of the automatic driving available section is approaching.

The acceleration/deceleration override detecting unit 44 is configured to detect an override by an accelerating/decelerating operation based on the acceleration/deceleration signal outputted from the accelerating/decelerating operation sensor 18. More specifically, the acceleration/deceleration override detecting unit 44 is configured to, when the acceleration/deceleration signal is a threshold or more, detect the override by the accelerating/decelerating operation. The acceleration/deceleration override detecting unit 44 also functions as a manual operation detecting unit for detecting the accelerating/decelerating operation performed by the passenger.

The steering override detecting unit 46 is configured to detect the override by the steering operation based on a steering signal outputted from the steering operation sensor 20. More specifically, the steering override detecting unit 46 is configured to, when the steering signal is a threshold or more, detect the override by the steering operation. The steering override detecting unit 46 also functions as a manual operation detecting unit that detects the steering operation performed by the passenger.

The automatic driving control unit 48 is configured to, integrally and automatically, control acceleration/deceleration and steering based on a recognition result of the external environment recognizing unit 40 and a determination result of the position determining unit 42. For example, the automatic driving control unit 48 is configured to integrally perform necessary processing for automatic acceleration/deceleration control and automatic steering control. The automatic driving control unit 48 integrally controls the acceleration/deceleration control unit 54 and the steering control unit 56 described below.

The mode switching unit 50 is configured to switch a driving mode to one of an automatic driving mode, a semi-automatic driving mode, and a manual driving mode. The semi-automatic driving mode includes a mode of automatically controlling only steering and manually controlling acceleration/deceleration, and a mode of automatically controlling only the acceleration/deceleration and manually controlling the steering.

The notification determining unit 52 is configured to determine a notification period, and determine notification contents suitable for the notification period.

The acceleration/deceleration control unit 54 is configured to automatically control the accelerating/decelerating operation when the driving mode is the automatic driving mode or the semi-automatic driving mode of automatically controlling only the acceleration/deceleration. For example, the acceleration/deceleration control unit 54 is configured to calculate an acceleration/deceleration that is necessary to keep an inter-vehicle distance between the vehicle 10 and the preceding vehicle to a distance according to a predetermined rule, or an acceleration/deceleration that is necessary to travel at a curve.

The steering control unit 56 is configured to automatically control the steering operation when the driving mode is the automatic driving mode or the semi-automatic driving mode of automatically controlling only the steering. For example, the steering control unit 56 is configured to calculate a steering angle that is necessary to cause the vehicle 10 to travel along a lane mark, or a steering angle that is necessary to steer at a curve.

The accelerating device 24 causes a drive source of the vehicle 10 to operate according to an acceleration command outputted from the acceleration/deceleration control unit 54. When the vehicle 10 is an engine vehicle, the accelerating device 24 causes a throttle valve or the like to operate according to an acceleration command, and causes a drive source (engine) to operate. When the vehicle 10 is an electrical vehicle including an electrical motor, the accelerating device 24 causes a drive source (electrical motor) to operate according to the acceleration command.

The decelerating device 26 causes a brake actuator to operate according to a deceleration command outputted from the acceleration/deceleration control unit 54, and causes a brake to operate.

The steering device 28 causes the electrical motor of the electrical power steering to operate according to the steering command outputted from the steering control unit 56. The electrical motor rotates the steering shaft.

The notifying device 30 notifies notification contents corresponding to a notification command outputted from the notification determining unit 52, to the passenger by way of the speaker, and/or the display, and/or tactile perception such as vibration of the steering wheel 60 (see FIG. 2), and the like.

[Transition of Driving Mode of Automatic Driving Control Device 12]

Figure 2:
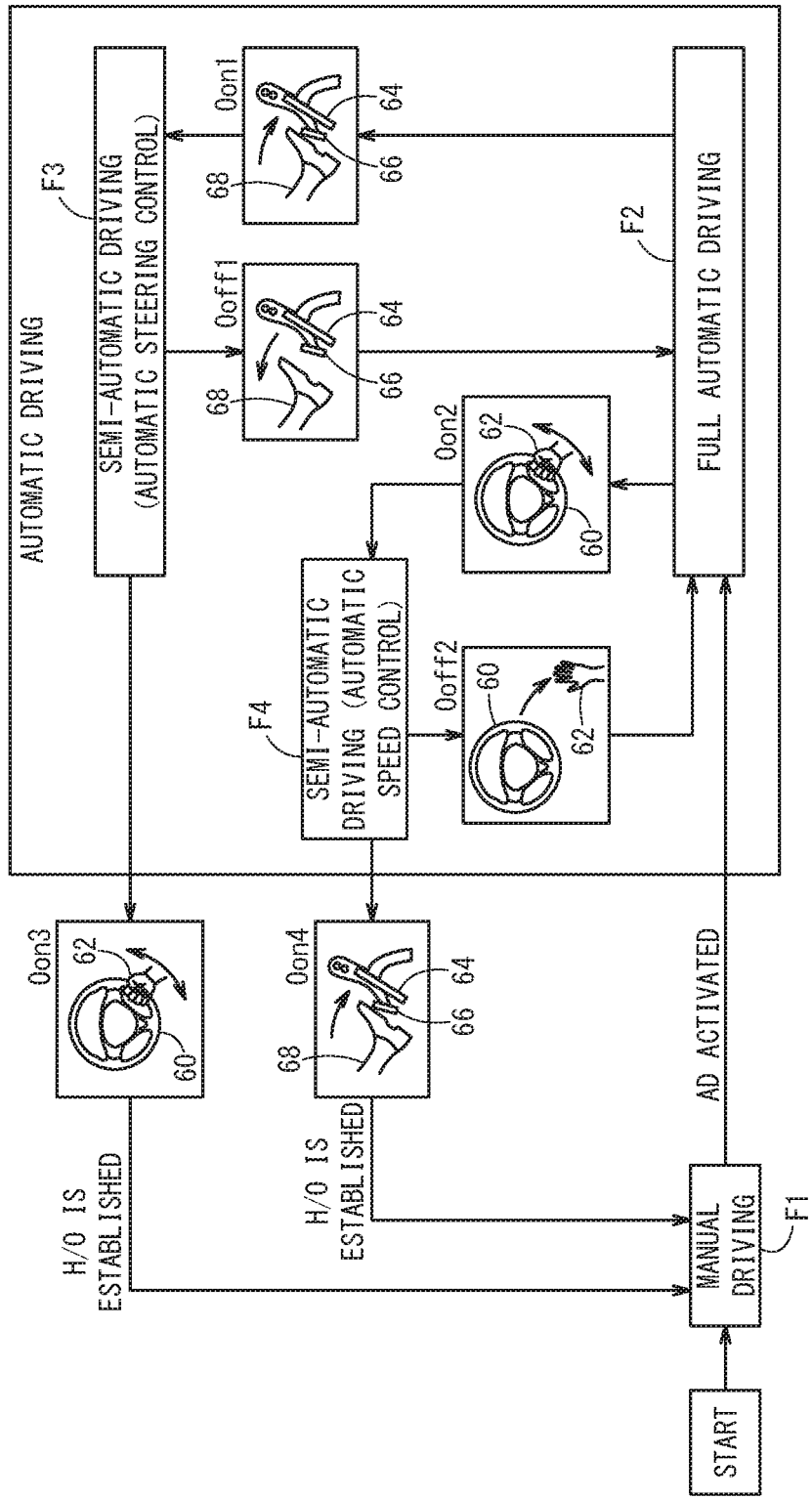
FIG. 2 is a state transition diagram for explaining an operation of the automatic driving control device.

Processing performed by the automatic driving control device 12 will be described with reference to FIGS. 1 and 2. Hereinafter, how the automatic driving control device 12 causes the driving mode to transition will be described.

<Initial State>

When the vehicle 10 is powered on, a driving state of the vehicle 10 transitions to a manual driving state (F1) that is an initial state. In this case, the mode switching unit 50 sets the manual driving mode as the driving mode.

<Transition from F1 to F2>

When the position determining unit 42 determines that the vehicle 10 is traveling in the automatic driving available section in the manual driving state (F1), the notification determining unit 52 outputs a notification command for notifying that automatic driving is available. The notifying device 30 notifies that the automatic driving is available. When an AD (Autonomous Driving) activation switch in the vehicle is switched on, automatic control of acceleration/deceleration and steering is started by the automatic driving control unit 48, the acceleration/deceleration control unit 54, and the steering control unit 56. In this case, the mode switching unit 50 switches the driving mode to the automatic driving mode, and the driving state of the vehicle 10 transitions from the manual driving state (F1) to a full automatic driving state (F2).

<Transition from F2 to F3>

In the full automatic driving state (F2), the passenger operates the accelerator pedal 64 or the brake pedal 66 by a foot 68. When the acceleration/deceleration override detecting unit 44 determines that an operation amount of the accelerator pedal 64 or the brake pedal 66 is a threshold or more, the override by the accelerating/decelerating operation is detected (Oon1). In this case, the mode switching unit 50 switches the driving mode to the semi-automatic driving mode. The automatic driving control unit 48 and the acceleration/deceleration control unit 54 deactivate only automatic acceleration/deceleration control, and the automatic driving control unit 48 and the steering control unit 56 maintain the automatic steering control. In this way, only the acceleration/deceleration control is overridden. The driving state of the vehicle 10 transitions from the full automatic driving state (F2) to the semi-automatic driving (automatic steering control) state (F3).

<Return from F3 to F2>

It is assumed that, in the semi automatic driving (automatic steering control) state (F3), the passenger stops operating the accelerator pedal 64 or the brake pedal 66. When the acceleration/deceleration override detecting unit 44 determines that the operation amount of the accelerator pedal 64 and the brake pedal 66 is less than the threshold, the override by the accelerating/decelerating operation is no more detected (OoFF1). In this case, the mode switching unit 50 switches the driving mode to the automatic driving mode. That is, the driving mode returns to the automatic driving mode. The automatic driving control unit 48 and the acceleration/deceleration control unit 54 resume the deactivated automatic acceleration/deceleration control. The driving state of the vehicle 10 returns from the semi-automatic driving (automatic steering control) state (F3) to the full automatic driving state (F2).

<Transition from F3 to F1>

It is assumed that, in the semi automatic driving (automatic steering control) state (F3), the passenger operates the accelerator pedal 64 or the brake pedal 66 by the foot 68, and operates the steering wheel 60 by a hand 62. When the steering override detecting unit 46 determines that the operation amount of the steering wheel 60 is the threshold or more, the override by the steering operation (Oon3) is detected. In this case, the mode switching unit 50 switches the driving mode to the manual driving mode. The automatic driving control unit 48 and the steering control unit 56 deactivate automatic steering control. The automatic acceleration/deceleration control has already been deactivated, and therefore the handover (H/O) is established. The driving state of the vehicle 10 transitions from the semi-automatic driving (automatic steering control) state (F3) to the manual driving state (F1).

<Transition from F2 to F4>

It is assumed that, in the full automatic driving state (F2), the passenger operates the steering wheel 60 by the hand 62. When the steering override detecting unit 46 determines that the operation amount of the steering wheel 60 is the threshold or more, the override by the steering operation (Oon2) is detected. In this case, the mode switching unit 50 switches the driving mode to the semi-automatic driving mode. The automatic driving control unit 48 and the steering control unit 56 deactivate only automatic steering control, and the automatic driving control unit 48 and the acceleration/deceleration control unit 54 maintain automatic acceleration/deceleration control. Thus, only the steering control is overridden. The driving state of the vehicle 10 transitions from the full automatic driving state (F2) to a semi-automatic driving (automatic speed control) state (F4).

<Return from F4 to F2>

It is assumed that, in the semi automatic driving (automatic speed control) state (F4), the passenger stops operating the steering wheel 60. When the steering override detecting unit 46 determines that the operation amount of the steering wheel 60 is less than the threshold, the override by the steering operation (Ooff2) is no longer detected. In this case, the mode switching unit 50 switches the driving mode to the automatic driving mode. That is, the mode switching unit 50 returns the driving mode to the automatic driving mode. The automatic driving control unit 48 and the steering control unit 56 resume the automatic steering control which was deactivated. The driving state of the vehicle 10 returns from the semi-automatic driving (automatic speed control) state (F4) to the full automatic driving state (F2).

<Transition from F4 to F1>

It is assumed that, in the semi automatic driving (automatic speed control) state (F4), the passenger operates the steering wheel 60 by the hand 62, and operates the accelerator pedal 64 or the brake pedal 66 by the foot 68. When the acceleration/deceleration override detecting unit 44 determines that the operation amount of the accelerator pedal 64 or the brake pedal 66 is the threshold or more, the override by the accelerating/decelerating operation (Oon4) is detected. In this case, the mode switching unit 50 switches the driving mode to the manual driving mode. The automatic driving control unit 48 and the acceleration/deceleration control unit 54 deactivate the automatic acceleration/deceleration control. The automatic steering control has already been deactivated, and therefore the handover (H/O) is established. The driving state of the vehicle 10 transitions from the semi-automatic driving (automatic speed control) state (F4) to the manual driving state (F1).

<Transition from F2 to F1>

It is assumed that, in the full automatic state (F2), the passenger operates the steering wheel 60 by the hand 62, and operates the accelerator pedal 64 or the brake pedal 66 by the foot 68. In this case, similar to a case where the full automatic driving state (F2) transitions to the semi-automatic driving (automatic steering control) state (F3) and then to the manual driving state (F1), or a case where the full automatic driving state (F2) transitions to the semi-automatic driving (automatic speed control) state (F4) and then to the manual driving state (F1), the handover (H/O) is established. The driving state of the vehicle 10 transitions from the full automatic driving state (F2) to the manual driving state (F1).

<Return from F1 to F2>

There is a predetermined situation that requires an override during automatic driving. For example, the predetermined situation includes a case that the vehicle 10 changes a lane, that the vehicle 10 travels at a branch or a junction, or that the vehicle 10 needs to be temporarily manually driven (for example, at a tollgate or the like). In such a case, the passenger performs the overrides by the accelerating/decelerating operation and the steering operation to establish the handover (H/O). In this case, the driving state of the vehicle 10 transitions from the full automatic state (F2), the semi-automatic driving (automatic steering control) state (F3), or the semi-automatic driving (automatic speed control) state (F4), to the manual driving state (F1).

Subsequently, it is assumed that in the manual driving state (F1), the passenger stops operating the steering wheel 60 and stops operating the accelerator pedal 64 and the brake pedal 66. It is further assumed that, during the override, the automatic driving control unit 48 determines that the situation corresponds to the predetermined situation that requires the override. In this case, the mode switching unit 50 switches the driving mode to the automatic driving mode. That is, the mode switching unit 50 returns the driving mode to the automatic driving mode. The automatic acceleration/deceleration control and automatic steering control are resumed, which were deactivated by the automatic driving control unit 48, the acceleration/deceleration control unit 54, and the steering control unit 56. The driving state of the vehicle 10 returns from the manual driving state (F1) to the full automatic driving state (F2).

[Driving Switch Processing of Automatic Driving Control Device 12]

Figure 3:
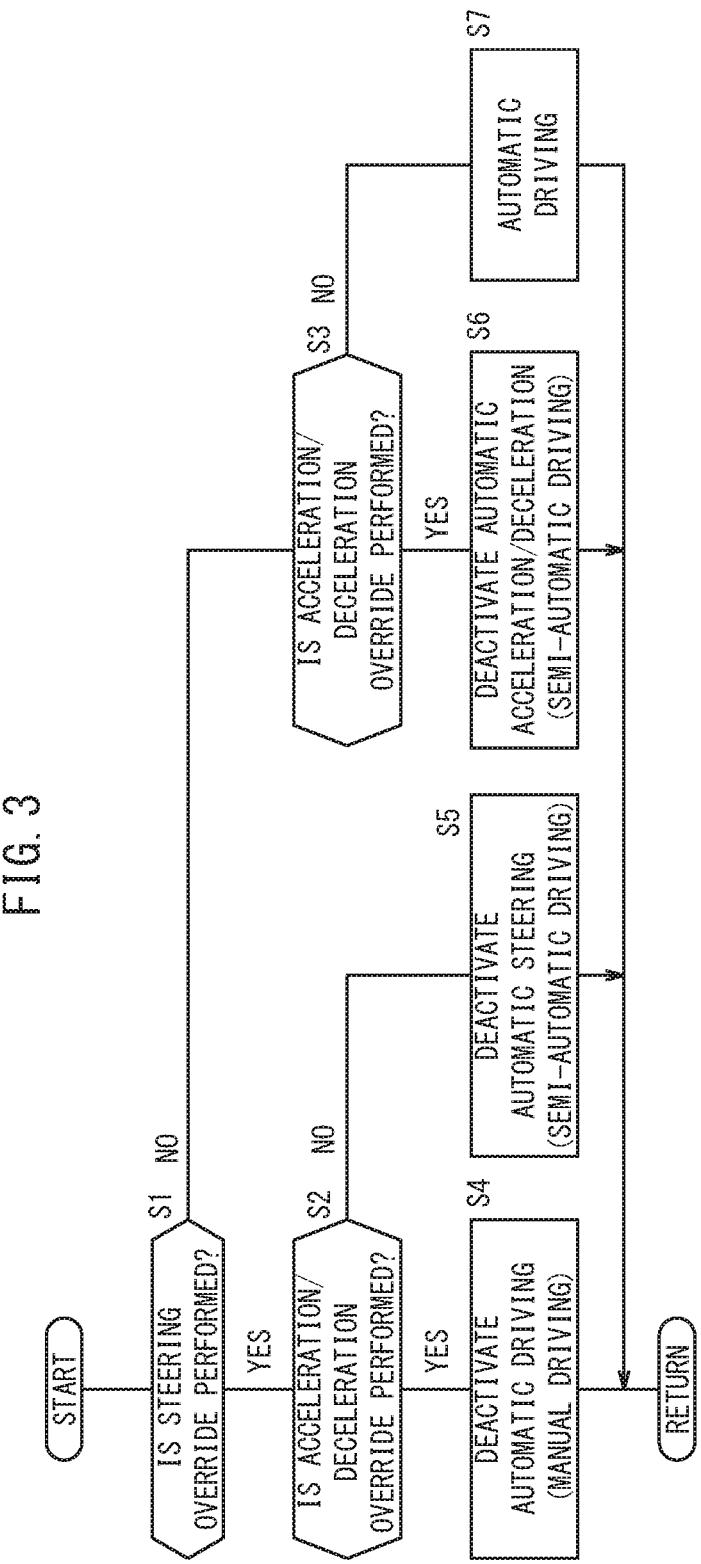
FIG. 3 is a flowchart for explaining the operation of the automatic driving control device.

Driving switch processing of the automatic driving control device 12 will be described with reference to FIGS. 1 and 3. A flow of processing will be described below, making a transition from the full automatic driving state (F2) shown in FIG. 2 as a starting point to the manual driving state (F1), the semi-automatic driving (automatic steering control) state (F3), and the semi-automatic driving (automatic speed control) state (F4). For example, the following processing is repeatedly executed per predetermined time, such as per time in milliseconds.

In step S1, the steering override detecting unit 46 determines whether or not an override by a steering operation is performed. When the operation amount indicated by a steering signal outputted from the steering operation sensor 20 is a threshold or more, the steering override detecting unit 46 detects the override by the steering operation (step S1: YES). In this case, the processing moves to step S2. When the operation amount indicated by the steering signal outputted from the steering operation sensor 20 is less than the threshold, the steering override detecting unit 46 does not detect the override by the steering operation (step S1: NO). In this case, the processing moves to step S3.

In step S2, the acceleration/deceleration override detecting unit 44 determines whether or not the override by the accelerating/decelerating operation is performed. When the operation amount indicated by an acceleration/deceleration signal outputted from the accelerating/decelerating operation sensor 18 is a threshold or more, the acceleration/deceleration override detecting unit 44 detects the override by the accelerating/decelerating operation (step S2: YES). In this case, the processing moves to step S4. When the operation amount indicated by the acceleration/deceleration signal outputted from the accelerating/decelerating operation sensor 18 is less than the threshold, the acceleration/deceleration override detecting unit 44 does not detect the override by the accelerating/decelerating operation (step S2: NO). In this case, the processing moves to step S5.

Similar to step S2, in step S3, the acceleration/deceleration override detecting unit 44 determines whether or not the override by the accelerating/decelerating operation is performed. When the operation amount indicated by the acceleration/deceleration signal outputted from the accelerating/decelerating operation sensor 18 is a threshold or more, the acceleration/deceleration override detecting unit 44 detects the override by the accelerating/decelerating operation (step S3: YES). In this case, the processing moves to step S6. When the operation amount indicated by the acceleration/deceleration signal outputted from the accelerating/decelerating operation sensor 18 is less than the threshold, the acceleration/deceleration override detecting unit 44 does not detect the override by the accelerating/decelerating operation (step S3: NO). In this case, the processing moves to step S7.

In step S4, automatic driving including the automatic acceleration/deceleration and steering control is deactivated and transitions to the manual driving state. In this case, the mode switching unit 50 switches the driving mode to the manual driving mode. The automatic driving control unit 48, the acceleration/deceleration control unit 54, and the steering control unit 56 deactivate the automatic acceleration/deceleration and steering control. That is, the handover is established. The operation authority of the vehicle 10 (the operation authority of the accelerating device 24, the decelerating device 26, and the steering device 28) is transferred to the passenger. Step S4 corresponds to F1 shown in FIG. 2.

In step S5, the automatic steering control is deactivated, and transitions to the semi-automatic driving state. In this case, the mode switching unit 50 switches the driving mode to the semi-automatic driving mode. The automatic driving control unit 48 and the steering control unit 56 deactivate only the automatic steering control. That is, only the steering control is overridden. The steering operation authority (the operation authority of the steering device 28) is transferred to the passenger. Step S5 corresponds to F4 shown in FIG. 2.

In step S6, the automatic acceleration/deceleration control is deactivated, and transitions to the semi-automatic driving state. In this case, the mode switching unit 50 switches the driving mode to the semi-automatic driving mode. The automatic driving control unit 48 and the deceleration control unit 54 deactivate only the automatic acceleration/deceleration control. That is, only the acceleration/deceleration control is overridden. The accelerating/decelerating operation authority (the operation authority of the accelerating device 24 and the decelerating device 26) is transferred to the passenger. Step S6 corresponds to F3 shown in FIG. 2.

In step S7, the full automatic driving state is maintained. Step S7 corresponds to F2 shown in FIG. 2.

[Notification Processing of Automatic Driving Control Device 12]

Figure 4:
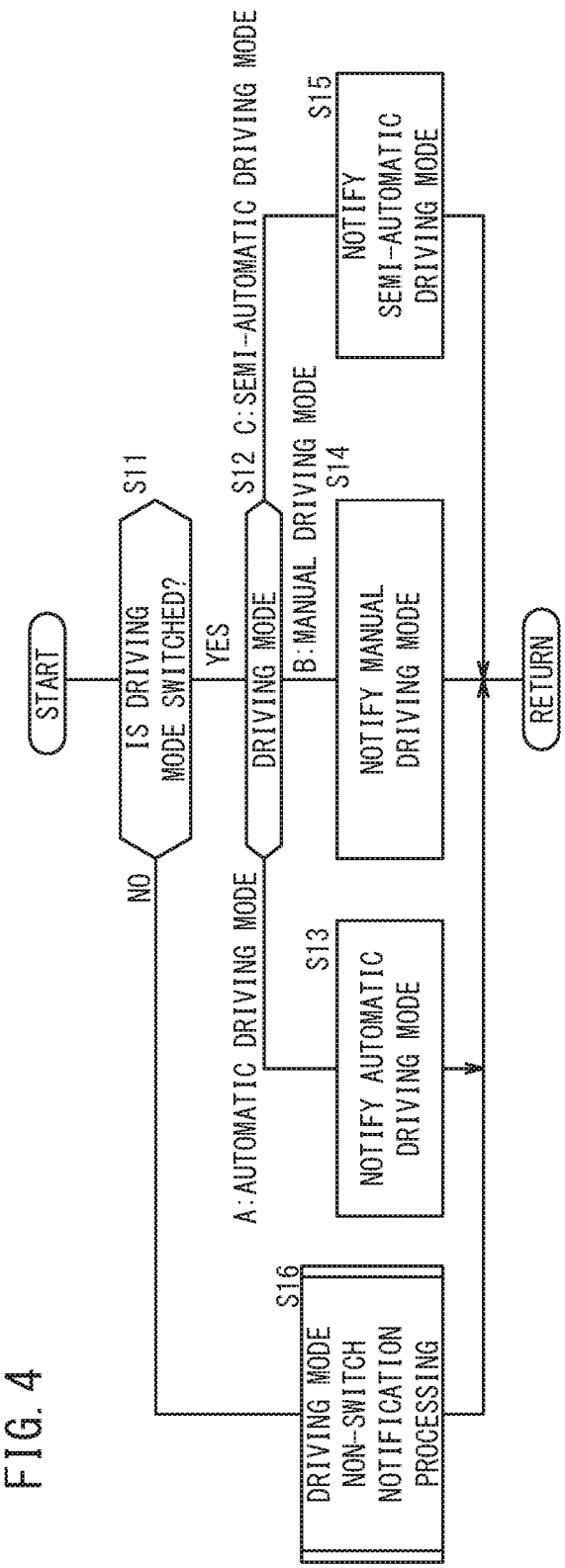
FIG. 4 is a flowchart for explaining notification processing of the automatic driving control device.

Notification processing of the automatic driving control device 12 will be described with reference to FIGS. 1, 4 and 5. The automatic driving control device 12 notifies to the passenger upon switching of driving or the like. A flow of the notification processing will be described. The following processing is repeatedly executed per predetermined time such as per time in milliseconds.

In step S11, the notification determining unit 52 determines whether or not the driving mode is switched. When it is determined that the driving mode is switched (step S11: YES), the processing moves to step S12. When it is determined that the driving mode is not switched (step S11: NO), the processing moves to step S16 to perform driving mode non-switch notification processing shown in FIG. 5.

In step S12, the notification determining unit 52 determines a type of the driving mode at this point of time. In a case of the automatic driving mode (step S12: A), the processing moves to step S13. In step S13, the notification determining unit 52 outputs to the notifying device 30 a notification command for notifying to the passenger that the driving mode has been switched to the automatic driving mode. The notifying device 30 notifies the passenger that the driving mode has been switched to the automatic driving mode. In a case of the manual driving mode (step S12: B), the processing moves to step S14. In step S14, the notification determining unit 52 outputs to the notifying device 30 a notification command for notifying the passenger that the driving mode has been switched to the manual driving mode. The notifying device 30 notifies the passenger that the driving mode has been switched to the manual driving mode. In a case of the semi-automatic driving mode (step S12: C), the processing moves to step S15. In step S15, the notification determining unit 52 outputs to the notifying device 30 a notification command for notifying the passenger that the driving mode has been switched to the semi-automatic driving mode. The notifying device 30 notifies the passenger that the driving mode has been switched to the semi-automatic driving mode.

<Driving Mode Non-Switch Notification Processing>

The driving mode non-switch notification processing will be described with reference to FIG. 5. In step S21, the notification determining unit 52 determines the driving mode at this point of time. In a case of the manual driving mode (step S21: A), the processing moves to step S22. In a case of the automatic or semi-automatic driving mode (step S21: B), the processing moves to step S24.

First, a case where the driving mode is determined as the manual driving mode in step S21 (step S21: A) will be described.

In step S22, the notification determining unit 52 determines whether or not it is necessary to re-notify that the driving mode is the manual driving mode. For example, the notification determining unit 52 determines the following re-notification conditions. That is, when re-notification has not yet been made at this point of time, the notification determining unit 52 determines whether or not a first predetermined time passes after the switch of the driving mode. When the re-notification has already been made at this point of time, the notification determining unit 52 determines whether or not a second predetermined time passes from previous re-notification. The acceleration/deceleration override detecting unit 44 and the steering override detecting unit 46, both of which also function as manual operation detecting units, determine whether or not a manual operation has been detected. When all re-notification conditions are satisfied (step S22: YES), the processing moves to step S23. In step S23, the notifying device 30 notifies the passenger that the driving mode is the manual driving mode. If any one of the re-notification conditions is not satisfied (step S22: NO), the driving mode non-switch notification processing is finished.

Next, a case where the driving mode is determined as the automatic or semi-automatic driving mode in step S21 (step S21: B) will be described.

In step S24, the position determining unit 42 determines whether or not an end position of the automatic driving available section is approaching. When the end position of the automatic driving available section is approaching (step S24: YES), the processing moves to step S25. When the end position of the automatic driving available section is not approaching (step S24: NO), the driving mode non-switch notification processing is finished.

In step S25, the notification determining unit 52 determines the driving mode at this point of time. In a case of the automatic driving mode (step S25: A), the processing moves to step S26. In a case of the semi-automatic driving mode (step S25: B), the processing moves to step S27.

In step S26, the notification determining unit 52 outputs to the notifying device 30 a notification command for encouraging the passenger to execute the overrides by the accelerating/decelerating operation and the steering operation. The notifying device 30 notifies, to the passenger, first notification for encouraging the overrides by the accelerating/decelerating operation and the steering operation.

In step S27, the notification determining unit 52 outputs to the notifying device 30 a notification command for encouraging the passenger to execute the override by an insufficient accelerating/decelerating operation and/or steering operation. The notifying device 30 notifies, to the passenger, second notification for encouraging the overrides by the accelerating/decelerating operation and steering operation which are insufficient.

Outline of Present Embodiment

The automatic driving control device 12 according to the present embodiment includes the automatic driving control unit 48, the acceleration/deceleration control unit 54, and the steering control unit 56 (also referred to as the control units 48, 54, 56 below) that automatically control acceleration/deceleration and steering of the vehicle 10, and the acceleration/deceleration override detecting unit 44 and the steering override detecting unit 46 (also referred to as the override detecting units 44, 46 below) that detect the overrides by the accelerating/decelerating operation and the steering operation performed by the passenger of the vehicle 10, and the mode switching unit 50 (also referred to as the switching unit 50 below) that switches the driving mode including the automatic driving mode and the manual driving mode based on detection results of the override detecting units 44, 46. When the override detecting units 44, 46 detect the override by one of the accelerating/decelerating operation and the steering operation, the switching unit 50 switches the driving mode to the semi-automatic driving mode having a high degree of automatic control compared to a case where the overrides by the accelerating/decelerating operation and the steering operation are detected. Accompanying the switch of the driving mode, when the driving mode is switched to the semi-automatic driving mode, the control units 48, 54, 56 partially and automatically control acceleration/deceleration and steering of the vehicle 10.

In the present embodiment, when the override by one of the accelerating/decelerating operation and the steering operation performed by the passenger of the vehicle 10 is detected, the acceleration/deceleration and the steering of the vehicle 10 are partially automatically controlled. That is, according to the override by only one of the accelerating/decelerating operation and the steering operation performed by the passenger of the vehicle 10, automatic driving is not switched to full manual driving. According to the present embodiment, it is possible to appropriately control the degree of automatic driving according to the override state, and prevent a behavior of the vehicle 10 unintended by the passenger. It is possible to maintain partial automatic control, and reduce a burden of driving.

In the automatic driving control device 12 according to the present embodiment, the semi-automatic driving mode is the driving mode of deactivating only automatic control corresponding to one of the accelerating/decelerating operation and the steering operation detected by the override detecting units 44, 46. According to the present embodiment, it is possible to deactivate only automatic control of an operation target that the passenger intends to manually control. Consequently, it is possible to prevent the behavior of the vehicle 10 unintended by the passenger, and reduce the burden of driving. Further, it is possible to transfer the operation authority of the operation target that the passenger intends to manually operate, smoothly from the system to the passenger.

In the automatic driving control device 12 according to the present embodiment, when the override detecting units 44, 46 detect the overrides by the accelerating/decelerating operation and the steering operation, the switching unit 50 switches the driving mode to the manual driving mode. According to the present embodiment, it is possible to transfer the operation authority of the vehicle 10 smoothly from the system to the passenger.

In the automatic driving control device 12 according to the present embodiment, when the driving mode is the semi-automatic driving mode and the override detecting units 44, 46 detect the overrides by the accelerating/decelerating operation and the steering operation, the switching unit 50 switches the driving mode to the manual driving mode. According to the present embodiment, it is possible to transfer the operation authority of the vehicle 10 smoothly from the system to the passenger.

In the automatic driving control device 12 according to the present embodiment, when the driving mode is the semi-automatic driving mode, and the override detecting units 44, 46 no longer detect the override by any one of the accelerating/decelerating operation and the steering operation, the switching unit 50 returns the driving mode to the automatic driving mode. According to the present invention, it is possible to smoothly resume automatic driving without performing an operation of starting automatic driving.

The automatic driving control device 12 according to the present embodiment includes the automatic driving control unit 48 (also referred to as the situation determining unit 48 below) that determines whether or not a situation where the override was made corresponds to a predetermined situation. After the switching unit 50 switches the driving mode to the manual driving mode in response to the overrides by the accelerating/decelerating operation and the steering operation detected by the override detecting units 44, 46, and when the override detecting units 44, 46 no longer detect the overrides by the accelerating/decelerating operation and the steering operation, and when the situation determining unit 48 determines that the situation where the overrides were made corresponds to the predetermined situation, the driving mode is returned to the automatic driving mode.

There is a predetermined situation that requires an override during automatic driving. For example, the predetermined situation includes a case that the vehicle 10 changes a lane, that the vehicle 10 travels at a branch or a junction, or that the vehicle 10 travels at a point where the vehicle 10 needs to be temporarily manually driven (e.g., a tollgate or the like). In the present embodiment, when it is determined that the situation where the override was made corresponds to such a predetermined situation, and the override operation is no longer performed, manual driving is automatically returned to automatic driving. According to the present embodiment, only when the vehicle 10 is in an appropriate state, it is possible to smoothly resume automatic driving without performing the operation of starting automatic driving.

The automatic driving control device 12 according to the present embodiment further includes the notification determining unit 52 (also referred to as the notifying unit 52) that notifies the state of the driving mode when the switching unit 50 switches the driving mode. According to the present embodiment, it is possible to make the passenger recognize the current driving mode.

The automatic driving control device 12 according to the present embodiment includes the accelerating/decelerating override detecting unit 44 and the steering override detecting unit 46 (also referred to as the manual operation detecting units 44, 46 below) that detect the accelerating/decelerating operation and the steering operation performed by the passenger of the vehicle 10. When the switching unit 50 switched the driving mode to the manual driving mode and thereafter the manual operation detecting units 44, 46 no longer detect at least one of the accelerating/decelerating operation and the steering operation, the notifying unit 52 re-notifies the state of the driving mode. More specifically, the notifying unit 52 notifies that the driving mode is the manual driving mode. According to the present embodiment, when the passenger forgets or does not notice that the driving mode has been switched to the manual driving mode, it is possible to make the passenger notice the switched mode.

The automatic driving control device 12 according to the present embodiment includes the position determining unit 42 that determines whether or not a traveling position of the vehicle 10 is in the automatic driving available section. When the position determining unit 42 determines that the end position of the automatic driving available section is approaching, the notifying unit 52 performs first notification for encouraging the overrides by the accelerating/decelerating operation and the steering operation. When the override detecting units 44, 46 do not detect the overrides by the accelerating/decelerating operation and the steering operation after the first notification, the notifying unit 52 performs second notification for encouraging an override by the accelerating/decelerating and/or the steering operation that is not detected by the override detecting units 44, 46.

When the automatic driving available section comes to an end, it is necessary to perform so-called handover for finishing the automatic driving and switching to manual driving. According to the present embodiment, in a case the handover has not been finished even when it is necessary, an override that is necessary to satisfy the handover condition is notified and is encouraged to the passenger. According to the present embodiment, it is possible to make the passenger recognize a necessary operation.

Other Embodiment

The present invention is not limited to the above embodiment, and can employ various configurations without departing from the gist of the present invention. For example, in the above embodiment, during the semi-automatic driving mode, only one of automatic acceleration/deceleration control and automatic steering control is deactivated. However, it is also possible to change automatic acceleration/deceleration control and/or automatic steering control to assist control. The assist control corresponds to semi-automatic driving that is not either full manual driving or full automatic driving.

In the above embodiment, when the manual operation is not detected after the switch to the manual driving mode, that the driving mode is the manual driving mode is re-notified (step S22 and step S23). In addition to this, even when a certain time passes after the re-notification and when the acceleration/deceleration override detecting unit 44 and the steering override detecting unit 46 no longer detect a manual operation, it is also possible to stop the vehicle 10. For example, at the same time as or after step S22 of the notification processing shown in FIG. 5, the notification determining unit 52 determines whether the number of times of re-notification is a predetermined number or whether a third predetermined time passes after the re-notification. When a determination condition is satisfied, the decelerating device 26 may automatically stop the vehicle 10.

In step S24 in the notification processing shown in FIG. 5, not only whether or not the end position of the automatic driving available section is approaching but also whether or not a fourth predetermined time has passed after previous notification may be determined. By doing so, when the vehicle 10 approaches the end position of the automatic driving available section, and the handover is not finished, the first notification (step S26) or the second notification (step S27) for encouraging the override is notified per fourth predetermined time.

Even when a certain time or more passes after the first notification or the second notification and when the override detecting unit 44 and the steering override detecting unit 46 do not detect the manual operation, it is also possible to stop the vehicle 10.

In step S27 of the notification processing shown in FIG. 5, instead of notifying execution of insufficient overrides by the accelerating/decelerating operation and the steering operation, execution of the overrides by the accelerating/decelerating operation and the steering operation may be notified.

The automatic driving mode may be switched to the manual driving mode according to the traveling situation of the vehicle 10. For example, there are traveling situations such as branches and junctions at which a timing of an own vehicle (vehicle 10) behavior needs to be adjusted to other vehicle behaviors. In such driving situations, only when both of the accelerating/decelerating operation and the steering operation are performed, overrides may be performed. Further, when only one of the accelerating/decelerating operation and the steering operation is performed, the override may be banned. This control can more reliably reduce an erroneous operation in a severe traveling situation.

In the above embodiment, when the vehicle 10 is powered on, the driving state of the vehicle 10 transitions to the manual driving state (F1 in FIG. 2) that is an initial state. The present invention is not limited to this, and the full automatic driving mode (F2 in FIG. 2) may be set as the initial state of the driving state.

DESCRIPTION OF REFERENCE NUMERALS

10: vehicle
12: automatic driving control device
14: road information sensor
16: position information providing device
18: accelerating/decelerating operation sensor
20: steering operation sensor
24: accelerating device
26: decelerating device
28: steering device
30: notifying device
40: external environment recognizing unit
42: position determining unit
44: acceleration/deceleration override detecting unit (override detecting unit, manual operation detecting unit)
46: steering override detecting unit (override detecting unit, manual operation detecting unit)
48: automatic driving control unit
50: mode switching unit
52: notification determining unit
54: acceleration/deceleration control unit
56: steering control unit

The invention claimed is:

1. An automatic driving control device comprising:
a control unit configured to automatically control acceleration/deceleration and steering of a vehicle;
an override detecting unit configured to detect overrides by an accelerating/decelerating operation and a steering operation performed by a passenger of the vehicle; and
a switching unit configured to switch a driving mode including an automatic driving mode and a manual driving mode based on a detection result of the override detecting unit,
wherein when the override detecting unit detects the override by one of the accelerating/decelerating operation and the steering operation, the switching unit is configured to switch the driving mode to a semi-automatic driving mode having a high degree of the automatic control compared to a case where the overrides by the accelerating/decelerating operation and the steering operation are detected,
wherein when the driving mode is the semi-automatic driving mode, and when the override detecting unit no longer detects the override by any one of the accelerating/decelerating operation and the steering operation, the switching unit is configured to return the driving mode to the automatic driving mode,
wherein when the override detecting unit detects the overrides by the accelerating/decelerating operation and the steering operation, the switching unit is configured to switch the driving mode to the manual driving mode, and thereafter, even when the override detecting unit no longer detects the override by any one of the accelerating/decelerating operation and the steering operation, the switching unit is configured not to return the driving mode to the automatic driving mode, and
wherein the semi-automatic driving mode continues as long as the override detecting unit detects one of the accelerating/decelerating operation and the steering operation and, includes a self-steering mode in which the control unit automatically controls only the steering of the vehicle and does not automatically control the accelerating/decelerating of the vehicle, and a self-accelerating/decelerating mode in which the control unit automatically controls only the accelerating/decelerating of the vehicle and does not automatically control the steering of the vehicle.

2. The automatic driving control device according to claim 1, wherein the semi-automatic driving mode is the driving mode configured to deactivate only the automatic control corresponding to one of the accelerating/decelerating operation and the steering operation that is detected by the override detecting unit.

3. The automatic driving control device according to claim 1, wherein when the driving mode is the semi-automatic driving mode, and when the override detecting unit detects the overrides by the accelerating/decelerating operation and the steering operation, the switching unit is configured to switch the driving mode to the manual driving mode.

4. The automatic driving control device according to claim 1, further comprising a situation determining unit configured to determine whether or not a situation where the override was made corresponds to a predetermined situation,
wherein after the switching unit switched the driving mode to the manual driving mode in response to the overrides by the accelerating/decelerating operation and the steering operation detected by the override detecting unit, and when the override detecting unit no longer detects the overrides by the accelerating/decelerating operation and the steering operation, and when the situation determining unit determines that the situation where the overrides were made corresponds to the predetermined situation, the switching unit is configured to return the driving mode to the automatic driving mode.

5. The automatic driving control device according to claim 1, further comprising a notifying unit configured to notify a state of the driving mode when the switching unit switches the driving mode.

6. The automatic driving control device according to claim 5, further comprising a manual operation detecting unit configured to detect the accelerating/decelerating operation and the steering operation performed by the passenger of the vehicle,
wherein the notifying unit is configured to re-notify the state of the driving mode, after the switching unit switched the driving mode to the manual driving mode, and when the manual operation detecting unit no longer detects at least one of the accelerating/decelerating operation and the steering operation.

7. The automatic driving control device according to claim 5, further comprising a position determining unit configured to determine whether or not a traveling position of the vehicle is in an automatic driving available section,
wherein the notifying unit is configured to perform first notification for encouraging the overrides by the accelerating/decelerating operation and the steering operation when the position determining unit determines that an end position of the automatic driving available section is approaching, and the notifying unit is configured to perform second notification for encouraging the override by the accelerating/decelerating operation and/or the steering operation that is not detected by the override detecting unit when the override detecting unit does not detect the overrides by the accelerating/decelerating operation and the steering operation after the first notification.

8. An automatic driving control device comprising:
a control unit configured to automatically control acceleration/deceleration and steering of a vehicle;
an override detecting unit configured to detect overrides by an accelerating/decelerating operation and a steering operation performed by a passenger of the vehicle; and
a switching unit configured to switch a driving mode including an automatic driving mode and a manual driving mode based on a detection result of the override detecting unit,
wherein when the override detecting unit detects the override by one of the accelerating/decelerating operation and the steering operation, the switching unit is configured to switch the driving mode to a semi-automatic driving mode having a high degree of the automatic control compared to a case where the overrides by the accelerating/decelerating operation and the steering operation are detected,
wherein when the driving mode is the semi-automatic driving mode, and when the override detecting unit no longer detects the override by any one of the accelerating/decelerating operation and the steering operation, the switching unit is configured to return the driving mode to the automatic driving mode,
wherein when the override detecting unit detects the overrides by the accelerating/decelerating operation and the steering operation, the switching unit is configured to switch the driving mode to the manual driving mode, wherein when the driving mode is the manual driving mode, and when an activation switch is switched on, the switching unit switches the driving mode to the automatic driving mode, and wherein the semi-automatic driving mode continues as long as the override detecting unit detects one of the accelerating/decelerating operation and the steering operation and, includes a self-steering mode in which the control unit automatically controls only the steering of the vehicle and does not automatically control the accelerating/decelerating of the vehicle, and a self-accelerating/decelerating mode in which the control unit automatically controls only the accelerating/decelerating of the vehicle and does not automatically control the steering of the vehicle.

9. The automatic driving control device according to claim 8, wherein the semi-automatic driving mode is the driving mode configured to deactivate only the automatic control corresponding to one of the accelerating/decelerating operation and the steering operation that is detected by the override detecting unit.

10. The automatic driving control device according to claim 8, wherein when the driving mode is the semi-automatic driving mode, and when the override detecting unit detects the overrides by the accelerating/decelerating operation and the steering operation, the switching unit is configured to switch the driving mode to the manual driving mode.

11. The automatic driving control device according to claim 8, further comprising a situation determining unit configured to determine whether or not a situation where the override was made corresponds to a predetermined situation, wherein after the switching unit switched the driving mode to the manual driving mode in response to the overrides by the accelerating/decelerating operation and the steering operation detected by the override detecting unit, and when the override detecting unit no longer detects the overrides by the accelerating/decelerating operation and the steering operation, and when the situation determining unit determines that the situation where the overrides were made corresponds to the predetermined situation, the switching unit is configured to return the driving mode to the automatic driving mode.

12. The automatic driving control device according to claim 8, further comprising a notifying unit configured to notify a state of the driving mode when the switching unit switches the driving mode.

13. The automatic driving control device according to claim 12, further comprising a manual operation detecting unit configured to detect the accelerating/decelerating operation and the steering operation performed by the passenger of the vehicle, wherein the notifying unit is configured to re-notify the state of the driving mode, after the switching unit switched the driving mode to the manual driving mode, and when the manual operation detecting unit no longer detects at least one of the accelerating/decelerating operation and the steering operation.

14. The automatic driving control device according to claim 12, further comprising a position determining unit configured to determine whether or not a traveling position of the vehicle is in an automatic driving available section, wherein the notifying unit is configured to perform first notification for encouraging the overrides by the accelerating/decelerating operation and the steering operation when the position determining unit determines that an end position of the automatic driving available section is approaching, and the notifying unit is configured to perform second notification for encouraging the override by the accelerating/decelerating operation and/or the steering operation that is not detected by the override detecting unit when the override detecting unit does not detect the overrides by the accelerating/decelerating operation and the steering operation after the first notification.

* * * * *